United States Patent
Molnar et al.

(10) Patent No.: US 8,901,193 B2
(45) Date of Patent: Dec. 2, 2014

(54) METHOD FOR MAKING A DUAL CURABLE ETHYLENE PROPYLENE DIENE POLYMER RUBBER COATING USING A PHOTOINITIATOR AND A PEROXIDE

(71) Applicant: Lion Copolymer Geismar, LLC, Geismar, LA (US)

(72) Inventors: Michael J. Molnar, Baton Rouge, LA (US); Arthur J. Fontenot, III, Baton Rouge, LA (US); Harold William Young, Jr., Baton Rouge, LA (US); Daniel S. Nelson, Waukesha, WI (US); Augusto Caesar Ibay, Waukesha, WI (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 14/179,455

(22) Filed: Feb. 12, 2014

(65) Prior Publication Data

US 2014/0228467 A1    Aug. 14, 2014

Related U.S. Application Data

(60) Provisional application No. 61/764,471, filed on Feb. 13, 2013, provisional application No. 61/764,479, filed on Feb. 13, 2013, provisional application No. 61/764,483, filed on Feb. 13, 2013.

(51) Int. Cl.

| | |
|---|---|
| *C08F 299/02* | (2006.01) |
| *C08F 2/50* | (2006.01) |
| *C08F 2/46* | (2006.01) |
| *B29C 71/04* | (2006.01) |
| *A61L 2/08* | (2006.01) |
| *A61L 24/00* | (2006.01) |
| *C08G 61/04* | (2006.01) |
| *C09D 123/16* | (2006.01) |
| *C08K 13/02* | (2006.01) |
| *C08K 3/36* | (2006.01) |
| *C08K 5/01* | (2006.01) |
| *C08K 5/5419* | (2006.01) |
| *C09D 7/00* | (2006.01) |
| *C09D 109/00* | (2006.01) |
| *C09D 5/14* | (2006.01) |
| *C09D 7/02* | (2006.01) |
| *C09D 7/12* | (2006.01) |
| *C08L 9/00* | (2006.01) |

(52) U.S. Cl.
CPC .............. *C09D 123/16* (2013.01); *C08K 13/02* (2013.01); *C08K 3/36* (2013.01); *C08K 5/01* (2013.01); *C08K 5/5419* (2013.01); *C09D 7/00* (2013.01); *C09D 109/00* (2013.01); *C09D 5/14* (2013.01); *C09D 7/02* (2013.01); *C09D 7/1216* (2013.01); *C09D 7/1233* (2013.01); *C08L 9/00* (2013.01)
USPC ........ 522/60; 522/6; 522/1; 522/71; 522/189; 522/184; 520/1

(58) Field of Classification Search
USPC .................. 522/60, 6, 1, 71, 189, 184; 520/1
See application file for complete search history.

(56) References Cited

U.S. PATENT DOCUMENTS

| | | | |
|---|---|---|---|
| 4,483,886 A | 11/1984 | Kowalski | |
| 5,091,447 A | 2/1992 | Lomasney | |
| 5,158,725 A | 10/1992 | Handa et al. | |
| 6,133,378 A | 10/2000 | Davis et al. | |
| 6,291,571 B1 | 9/2001 | Fisher | |
| 6,632,509 B1 | 10/2003 | Davis et al. | |
| 6,682,779 B1 * | 1/2004 | Wefringhaus et al. | 427/314 |
| 6,897,281 B2 | 5/2005 | Lubnin et al. | |
| 7,528,189 B2 * | 5/2009 | Taylor et al. | 524/397 |
| 7,744,803 B2 | 6/2010 | Jackson et al. | |
| 8,227,565 B2 | 7/2012 | Wu et al. | |
| 8,425,946 B2 * | 4/2013 | Green et al. | 424/725 |
| 2002/0013402 A1 * | 1/2002 | Fisher | 524/543 |
| 2008/0265516 A1 | 10/2008 | Walker et al. | |
| 2009/0169813 A1 | 7/2009 | West | |
| 2010/0222447 A1 * | 9/2010 | Jackson et al. | 522/37 |
| 2012/0116021 A1 | 5/2012 | Liang et al. | |
| 2012/0183787 A1 | 7/2012 | Nagelsdiek et al. | |
| 2012/0309862 A1 | 12/2012 | Jacob | |
| 2012/0322913 A1 * | 12/2012 | Fontenot et al. | 523/351 |
| 2013/0312636 A1 * | 11/2013 | Fornara et al. | 106/31.75 |

FOREIGN PATENT DOCUMENTS

WO    20110142964 A1    11/2011

* cited by examiner

*Primary Examiner* — Ling Choi
*Assistant Examiner* — Jessica E Whiteley
(74) *Attorney, Agent, or Firm* — Buskop Law Group, PC; Wendy Buskop

(57) ABSTRACT

A durable ambient light curable waterproof liquid rubber coating with volatile organic compound (VOC) content of less than 450 grams per liter made from ethylene propylene diene terpolymer (EPDM) in a solvent, a photoinitiator, an additive, pigments, and fillers, and a co-agent and a method for making the formulation, wherein the formulation is devoid of thermally activated accelerators.

16 Claims, No Drawings

METHOD FOR MAKING A DUAL CURABLE ETHYLENE PROPYLENE DIENE POLYMER RUBBER COATING USING A PHOTOINITIATOR AND A PEROXIDE

CROSS REFERENCE TO RELATED APPLICATIONS

The present application claims priority to and the benefit of U.S. Provisional Patent Application Ser. No. 61/764,471 filed on Feb. 13, 2013, entitled "AMBIENT LIGHT CURABLE ETHYLENE PROPYLENE DIENE MONOMER RUBBER COATING DEVOID OF THERMALLY ACTIVATED ACCELERATORS"; U.S. Provisional Patent Application Ser. No. 61/764,479 filed on Feb. 13, 2013, entitled "DUAL CURABLE ETHYLENE PROPYLENE DIENE MONOMER RUBBER COATING USING A PHOTOINITIATOR AND A PEROXIDE"; and U.S. Provisional Patent Application Ser. No. 61/764,483 filed on Feb. 13, 2013, entitled "HIGH SOLIDS LOW VOC CONTENT ETHYLENE PROPYLENE DIENE RUBBER COATING." These references are hereby incorporated in their entirety.

FIELD

The present embodiments generally relate to a method for making ethylene propylene diene terpolymer rubber coating compositions that are consumer friendly to use and require no additional mixing of a curing agent.

BACKGROUND

A need exists for a method for making an ambient temperature waterproof rubber coating that cures without the need for blending an additional component.

A need exists for a method for making an ambient temperature waterproof rubber coating that requires no active heat for curing.

A further need exists for a method for making an ethylene propylene diene terpolymer (EPDM) waterproof rubber coating formed from a liquid that does not require isocyanates or similar toxic chemicals.

A need exists for a method for making a formulation that can be applied to existing roofs and existing substrates as a "cool white easily applied waterproof rubber coating" to lower the costs of energy and reduce maintenance costs of a facility.

The present embodiments meet these needs.

DETAILED DESCRIPTION OF THE EMBODIMENTS

Before explaining the present method in detail, it is to be understood that the method is not limited to the particular embodiments and that it can be practiced or carried out in various ways.

The present embodiments generally relate to a method for making ethylene propylene diene terpolymer rubber coating compositions that are consumer friendly to use and require no additional mixing of a curing agent as a two component system.

The present embodiments relate to a method for making a durable ambient light curable waterproof liquid rubber coating with volatile organic compound (VOC) content of less than 450 grams per liter, such as without benzene or xylene.

A benefit of the method is that the liquid rubber coating produced from the method is ambient temperature curable and devoid of thermally activated accelerators, so that through simple exposure to ambient light, the liquid rubber coating curing is initiated without the need to add an additional component or to add active heat to cure the rubber formulation.

A benefit of the method is that the liquid EPDM formulation produced by the method is easy to apply in the field since it is a liquid and no heat source is needed to cure the formulation.

A benefit of the method is that users of the liquid EPDM formulation produced by the method will avoid the possibility of having second or third degree burns from applying the composition, because the coating is "heat free" to cure on a substrate which can be a roofing tile or flat roof base material. The formulation produced from the method does not "hold heat" but reflects heat.

A liquid EPDM formulation produced from the method creates a cured coating that has (1) waterproof sealing to resist hurricane strength rainfall; (2) resistance to acid rain degradation allowing at least 15 years useful life for a roof in an acid rain area; (3) ability to withstand cold temperatures of down to −50 degrees Centigrade, such as Arctic weather.

A durable ambient light curable waterproof rubber liquid coating formulation produced from the method does not require isocyanates or similar toxic curing agents which are known to have a harmful effect on people as evidenced by allergic sensitization to isocyanates.

A durable ambient light curable waterproof liquid rubber coating formulation produced from the method can be applied to existing roofs and existing substrates as a "cool white roof" material lowering the cost of building maintenance, lowering the cost of energy, and reducing the dependence of the United States on foreign oil.

Schools, hospitals, public housing facilities, warehouses, residential homes, and facilities for the elderly can benefit from a durable ambient light curable waterproof liquid rubber coating formulation produced from the method, on the roofs of their institutions because the material will remain cool, while simultaneously sealing the roof, providing a reflective surface to reduce costs of energy and costs of maintaining the facilities.

A cured material produced from the method can extend the life of a roof, reducing the need for roof replacement.

In other embodiments, the formulation produced from the method can be used to seal docks for marinas.

Another benefit of the method is that the crosslinking reaction creating cured material is initiated in the presence of ambient light which can be a light frequency that is visible, ultraviolet, or infrared, causing the formulation produced from the method to be simple to use.

The method saves time in application of the coating as no additional equipment is needed to mix the formulation produced from the method prior to application on the roof substrate, the dock, or another intended substrate.

A benefit of a durable ambient light curable waterproof liquid rubber coating formulation produced from the method is that the invention is stable in its packaging system for delivery to a user.

The following terms are used herein:

The term "active heating" as used herein can refer to the external addition of energy to the formulation by the use of heat generating devices, such as adding energy through mechanical means with heated application hoses, infrared lamps, heat guns, or by adding heat using an extruder.

The term "additive" as used herein can refer to an antioxidant, an ultraviolet light stabilizer, or combinations thereof.

The term "adhesion promoter" as used herein can refer to a component made from molecules that tie the formed ambient light curable EPDM coating to a substrate for enhanced bonding. An example of an adhesion promoter can be SARET® 633 or 634 made by Arkema France.

The term "air release agent" can refer to mineral oil, paraffinic oil, silicone oil, or similar oil. An example of paraffinic oil can be FHR ULTRA® made by Flint Hills Resources of Wichita, Kans., an example of a mineral oil can be UNIQ-FORM™ made by UniqChem UK Co., Ltd., and an example of an air release agent can be BYK®-320 made by BYK-Chemie GmbH of Germany.

The term "ambient light" as used herein can refer to visible, ultraviolet or near infrared light. The range of wavelength from ultraviolet to near infrared light can range in wavelength from 200 nanometers to 1500 nanometers.

The term "ambient temperature" as used herein can refer to a temperature less than 50 degrees Celsius and equal to or greater than −10 degrees Celsius.

The term "antioxidant" can refer to a hindered phenolic stabilizer, such as IRGANOX® 1076 made by Ciba Specialty Chemicals Corporation of Tarrytown, N.Y.

The term "anti-settling agent" as used herein can refer to an agent that prevents the settling of pigments and fillers in a liquid formulation. An example of a usable anti-settling agent can be M-P-A® made by Elementis Specialties, Inc. of Hightstown, N.J. Another example is a hydroxyethyl cellulose. Still another example is a fumed silica.

The term "biocide" can be a variety of ingredients. A methylchloroisothiazolinone, such as MERGAL® K9N made by Troy Corporation or ROCIMA™ 363 available from Dow Chemical of Midland, Mich. can be used.

The term "co-agent" as the term is used herein can refer to a reactive molecule with two or more functional groups, for bonding with an EPDM molecule. The co-agent can enhance crosslinking between two EPDM molecules initiated by a photoinitiator. The term "enhances" can refer to an accelerated process of crosslinking. Co-agent accelerates reaction of the free radicals with the active sites of the unsaturated diene to cross link the terpolymer.

Usable co-agents can include an acrylate such as hexane diol diacrylate, polybutadiene acrylate, a triallyl cyanurate, polybutadiene, and phenylenedimaleimide known as VAMAC® DP HVA-2 available from E.I. DuPont of Wilmington, Del.

The term "defoamer" as used herein can refer to components, such as polymethyl alkyl siloxane. An example of a defoamer can be BYK®-A500 defoamer. Defoamers can include modified polysiloxane or polymethylsiloxane in solvents such as BYK®-066 N or BYK®-052 made by BYK-Chemie GmbH of Germany.

The term "flame retardant" as referred to herein can refer to a liquid or a powder flame retardant. The powdered version can be used in the method at a different blending point than the liquid version. An example of a flame retardant usable herein is alumina trihydrate. Flame retardants can be used as fillers in this invention. Flame retardants can be used as pigments in this invention.

The term "inert atmosphere" as used herein can refer to an atmosphere placed over the reaction using an inert gas such as nitrogen or argon.

The term "low shear" as used herein can refer to mixing at a blade tip speed of less than 2500 linear feet per minute used in the mixing device.

The term "molecular weight" for the polymer as used herein can refer to a weight average molecular weight as determined by gel permeation chromatography (GPC) measurement.

The term "photoinitiator" as used herein can refer to photoinitiators that are devoid of thermally activated accelerators.

Usable photoinitiators include type I photoinitiators which can include: bis(2,4,6-trimethylbenzoyl)-phenyl phosphineoxide, known as IRGACURE® 819 and 1-hydroxy-cyclohexyl-phenyl-ketone known as IRGACURE® 184 made by BASF Corporation.

Type II photoinitiators can be usable and can include benzophenone, alpha hydroxyl ketone, alpha amino ketone, isothioxanthone, and combinations thereof. All photoinitiators can remain devoid of thermally activated accelerators.

The term "peroxide" can refer to a chemical compound containing an oxygen-oxygen single bond or the peroxide anion. Examples of usable peroxides include a peroxyketal, a peroxyester, a dialkyl peroxide, a peroxy carbonate, or an azo initiator.

The term "pigment dispersant" can refer to a chemical that allows pigment to remain homogenously dispersed in the coating. Examples of usable pigment dispersants include NUOSPERSE® 9100 available from Elementis Specialties, Inc.

The term "plant-based solvent" can refer to vegetable based, grass based, weed based, nut based, or food based solvents including but not limited to methyl soyate. Only solvents that dissolve EPDM or one of the other polymers are usable herein.

The term "plasticizer" as used herein can refer to non-volatile plasticizers, including paraffinic oil, silicone oil, naphthenic oil, plant based oil, diester oil, mineral oil, a low molecular weight polyalpha olefin, or combinations thereof.

The term "terpolymer" as used herein can refer to a polymer of ethylene, propylene, and one or more non-conjugated dienes. Examples of non-conjugated diene usable herein can include norbornene, ethylidene norbornene, 1,4, hexadiene, dicyclopentadiene, vinyl norbornene, methylene norbornene, and combinations thereof.

In other embodiments, the terpolymer of ethylene, propylene and one or more non-conjugated dienes can have the propylene replaced by another alpha olefin, such as but not limited to 1-butene, 1-pentene, 1-hexene, 1-heptene, 1-octene, or combinations thereof.

In embodiments, the "polymer" can be ethylene propylene polymer, ethylene butene polymer, ethylene pentene polymer, or combinations thereof.

"Solvents" as the term is used herein can refer to an aliphatic solvent, an aromatic solvent, or a plant based solvent with a density from 0.6 to 1.2 grams per cubic centimeter. Examples of usable solvents include mineral spirits, toluene, hexane, xylene, hexamethyldi-siloxane, or combinations thereof.

The term "thermally activated accelerator" as the term is used herein can refer to accelerators which require temperatures above ambient temperatures to cure an EPDM coating and specifically require "active heating."

In a formulation produced by the method, no thermally activated accelerators are used, which is a feature of this method.

The term "ultraviolet stabilizers" can refer to chemicals such as hindered amine light stabilizers, benzotriazoles, or similar components.

The term "waterproof" as used herein can refer to a moisture vapor permeation rating of less than 1.

The term "wetting agent" can refer to chemicals such as DISPONE™ 983 available from Elementis Specialties, Inc.

Wetting agents can include silicone polyacrylate copolymer in solvents such as BYK®-3550 or a solvent-free polyether modified dimethylpolysiloxane such as BYK®-378 made by BYK-Chemie GmbH of Germany.

A formulation produced by the method can be coated onto various substrates. Substrates that are usable with this formed ambient light curable waterproof liquid rubber coating can include roofs, aged PVC materials, aged EPDM roofing materials, aged thermoplastic olefin materials, metal, glass, car port roofs, docks, concrete, polyurethane foam, acrylate material system, wood, oil rig mats, and high impact devices.

The embodiments can include a method for making a durable ambient light curable waterproof liquid rubber formulation with a volatile organic compound (VOC) content of less than 450 grams per liter.

The method involves blending in a closed vessel forming a solution, a first portion of ethylene propylene diene terpolymer (EPDM) with a first portion of solvent, wherein the ethylene propylene diene terpolymer (EPDM) is 50 weight percent to 99 weight percent of a total amount of ethylene propylene diene terpolymer used in a resulting durable ambient light curable waterproof liquid rubber formulation and the first portion of solvent is 33 weight percent to 67 weight percent of a total amount of solvent used in the resulting durable ambient light curable waterproof liquid rubber formulation.

The second step involves mixing the solution in a high shear mixer for at least 10 to 240 minutes at a temperature from 20 degrees Celsius to 50 degrees Celsius forming a high viscosity solution.

As a third step, a second portion of ethylene propylene diene terpolymer (EPDM) is added to the high viscosity solution, wherein the second portion of ethylene propylene diene terpolymer (EPDM) is 0.1 weight percent to 50 weight percent of the total amount of ethylene propylene diene terpolymer (EPDM) used in the resulting durable ambient light curable waterproof liquid rubber formulation.

Next, a second portion of solvent is added to the high viscosity solution wherein the second portion of solvent is 33 weight percent to 80 weight percent of a total amount of solvent used in the resulting durable ambient light curable waterproof liquid rubber formulation.

As a fifth step, the high viscosity solution is blended for 10 minutes to 120 minutes at a temperature from 20 degrees Celsius to 50 degrees Celsius to form a low viscosity liquid intermediate rubber formulation with a saturated backbone of propylene, a saturated backbone of ethylene, and an unsaturated diene with ultra violet activated sites capable of crosslinking with or reacting with a free radical or a free radical on another terpolymer.

For a sixth step, 0.1 weight percent to 10 weight percent of a photoinitiator devoid of thermally activated accelerators is added to the low viscosity liquid intermediate rubber formulation based on the total weight of the resulting dual curable waterproof liquid rubber formulation to generate free radicals that react with the active sites of the unsaturated diene, forming a low viscosity liquid intermediate rubber formulation with photoinitiator;

As a seventh step, 0.1 to 15 weight percent of a peroxide is added to the a low viscosity liquid intermediate rubber formulation with photoinitiator, wherein the peroxide comprises at least one of: a peroxyketal, a peroxyester, a dialkyl peroxide, a peroxy carbonate, or an azo initiator forming a dual cure liquid; and As the eighth step, the dual cure liquid is blended at a low shear for 10 minutes to 120 minutes at a temperature from 20 degrees Celsius to 50 degrees Celsius in the absence of light forming the dual curable waterproof liquid rubber formulation, wherein the dual curable waterproof liquid rubber formulation is adapted to form a waterproof seal on a substrate in the presence of ultraviolet light and heat.

It is contemplated that temperatures above 50 degrees Celsius can be utilized, but this may result in the undesirable effect of flash evaporating the solvent component.

In embodiments, the method can also involve mixing the photoinitiators in a photoinitiator solvent prior to adding the photoinitiators to the low viscosity liquid intermediate rubber formulation, wherein the photoinitiator solvent is from 1 weight percent to 20 weight percent based on the total solvent content of the resulting durable ambient light curable waterproof liquid rubber formulation. The photoinitiator solvent can be a toluene, a xylene, a naphthalene, or a similar organic solvent.

Photoinitiators include Type I photoinitiators including: bis(2,4,6-trimethylbenzoyl)-phenyl phosphineoxide, and 1-hydroxy-cyclohexyl-phenyl-ketone.

Photoinitiators include Type II photoinitiators including benzophenone, alpha hydroxyl ketone, alpha amino ketone, isothioxanthone, and combinations thereof. All photoinitiators are devoid of thermally activated accelerators.

In embodiments, the first portion of ethylene propylene diene terpolymer can have a different molecular weight than the second portion of ethylene propylene diene terpolymer.

In other embodiments, the method can involve adding to the high viscosity solution, at a temperature from 20 degrees Celsius to 50 degrees Celsius, at least one of (a) 50 weight percent to 99 weight percent of a pigment, and (b) 50 weight percent to 99 weight percent of a filler.

The amount of the pigment and the filler added represent a total weight percent of pigment and filler in the high viscosity solution.

The method involves blending the pigment and filler to a particle dispersion from 4 to 8 units on the Hegman scale.

In further embodiments, this method can involve adding to the low viscosity liquid intermediate 0.1 weight percent to 10 weight percent of additives based on a total weight of the resulting durable ambient light curable waterproof liquid rubber formulation.

The additives can be a hindered phenolic stabilizer or a hindered amine ultraviolet stabilizer.

The method can also involve adding to the low viscosity liquid intermediate 0.1 weight percent to 10 weight percent of an adhesion promoter based on the total weight of the resulting durable ambient light curable waterproof liquid rubber formulation after adding the second portion of EPDM to the high viscosity solution.

The adhesion promoter can be a zinc diacrylate or a zinc dimethacrylate.

In embodiments, the method can involve adding to the low viscosity liquid intermediate rubber formulation: 0.1 weight percent to 10 weight percent of a pigment dispersant based on the total weight of the resulting durable ambient light curable waterproof liquid rubber formulation.

In embodiments, the pigment dispersant can be 1 methoxy-2-propylacetate.

In further embodiments, the method can involve adding to the low viscosity liquid intermediate rubber formulation: 0.1 weight percent to 10 weight percent of an anti-settling agent based on the total weight of the resulting durable ambient light curable waterproof liquid rubber formulation.

The anti-settling agent can be a hydroxylethyl cellulose and a fumed silica.

In other embodiments, the method can involve adding to the low viscosity liquid intermediate rubber formulation 0.1 weight percent to 10 weight percent of a defoamer based on the total weight of the resulting durable ambient light curable waterproof liquid rubber formulation.

The defoamer can be a polymethyl alkyl siloxane, a modified polysiloxane, and a polymethylsiloxane in a solvent.

In embodiments, the method can involve adding to the low viscosity liquid intermediate rubber formulation 0.1 weight percent to 10 weight percent of an air release agent based on the total weight of the resulting durable ambient light curable waterproof liquid rubber formulation.

The air release agent can be a mineral oil, a paraffinic oil, a silicone oil, or a similar oil.

In further embodiments, the method can involve adding 0.1 weight percent to 30 weight percent of a flame retardant to low viscosity liquid intermediate rubber formulation, based on the total weight of the resulting durable ambient light curable waterproof liquid rubber formulation.

The flame retardant can be an alumina trihydrate. Flame retardants can be added to: a pigment, or a filler, and optionally an additive and then to the low viscosity liquid intermediate rubber formulation or after the second portion of ethylene propylene diene terpolymer is added to the high viscosity solution.

In still more embodiments, the method can involve adding to the low viscosity liquid intermediate rubber formulation 0.1 weight percent to 12 weight percent of a wetting agent based on the total weight of the resulting durable ambient light curable waterproof liquid rubber formulation.

The wetting agent can be a silicone polyacrylate copolymer in solvent and a solvent-free polyether modified dimethylpolysiloxane.

The method can also involve adding to the low viscosity liquid intermediate rubber formulation 0.1 weight percent to 10 weight percent of a biocide based on the total weight of the resulting durable ambient light curable waterproof liquid rubber formulation.

In embodiments, the biocide can be a methylchloroisothiazolinone.

In embodiments, the method can involve adding 0.1 weight percent to 30 weight percent of a low molecular weight non-volatile plasticizer low viscosity liquid intermediate rubber formulation after the second portion of solvent is added to the high shear mixture.

The low molecular weight non-volatile plasticizer can be a paraffinic oil, naphthenic oil, plant based oil, diester oil, silicone oil, a mineral oil, a low molecular weight polyalphaolefin, or combinations thereof.

In embodiments, 0.01 weight percent to 10 weight percent of a co-agent can be added to the low viscosity liquid intermediate rubber formulation based on a total weight of the resulting dual curable waterproof liquid rubber formulation of a co-agent to the second low viscosity liquid intermediate rubber formulation.

The co-agent can be an acrylate, a triallyl cyanurate, a polybutadiene, or a phenylenedimaleimide.

In embodiments, the solvents can be selected from the group: mineral spirits and hexamethyldi-siloxane.

In embodiments, the first and second solvent portions can be different solvents.

The invention can include creating a special waterproof formulation with low volatile organic compound content. The volatile organic compound content can be less than 450 and as low as 0.1 volatile organic content grams per liter.

The invention relates to a durable ambient light curable waterproof liquid rubber formulation with a volatile organic compound content of less than 450 grams per liter.

The formulation includes a low viscosity liquid intermediate rubber formulation with a saturated backbone of propylene, a saturated backbone of ethylene, and an unsaturated diene with ultra violet activated sites capable of crosslinking with or reacting with a free radical or a free radical on another terpolymer.

The low viscosity liquid intermediate rubber formulation contains a first portion of ethylene propylene diene terpolymer (EPDM).

The ethylene propylene diene terpolymer (EPDM) is 50 weight percent to 99 weight percent of a total amount of ethylene propylene diene terpolymer.

The low viscosity liquid intermediate rubber formulation contains a first portion of solvent.

The first portion of solvent is 33 weight percent to 67 weight percent of a total amount of solvent used in the resulting durable ambient light curable waterproof liquid rubber formulation.

The low viscosity liquid intermediate rubber formulation contains a second portion of ethylene propylene diene terpolymer (EPDM).

The second portion of ethylene propylene diene terpolymer (EPDM) is 0.1 weight percent to 50 weight percent of the total amount of ethylene propylene diene terpolymer (EPDM).

The low viscosity liquid intermediate rubber formulation contains a second portion of solvent.

The second portion of solvent is 33 weight percent to 80 weight percent of a total amount of solvent used in the resulting durable ambient light curable waterproof liquid rubber formulation.

To the low viscosity liquid intermediate rubber formulation is added 0.1 to 15 weight percent of a peroxide.

The peroxide is based upon the total weight of the resulting dual curable waterproof liquid rubber formulation.

The peroxide can be a peroxyketal, a peroxyester, a dialkyl peroxide, a peroxy carbonate, or an azo initiator.

To the low viscosity liquid intermediate rubber formulation is added 0.1 weight percent to 10 weight percent of a photo-initiator devoid of thermally activated accelerators to the low viscosity liquid intermediate rubber formulation to generate free radicals that react with the active sites of the unsaturated diene.

The formulation creates a durable ambient light curable waterproof liquid rubber formulation devoid of thermally activated accelerators and adapted to crosslink and form a waterproof seal on a substrate only in the presence of ultra-violet light.

In embodiments, the formulation includes Type I photoinitiators including: bis(2,4,6-trimethylbenzoyl)-phenyl phosphineoxide, and 1-hydroxy-cyclohexyl-phenyl-ketone.

In embodiments, the formulation includes Type II photo-initiators including benzophenone, alpha hydroxy ketone, alpha amino ketone, isothioxanthone, and combinations thereof, wherein all photoinitiators are devoid of thermally activated accelerators.

In embodiments, the first portion of ethylene propylene diene terpolymer can have a different molecular weight than the second portion of ethylene propylene diene terpolymer.

In embodiments, the formulation includes at least one of: 50 weight percent to 99 weight percent of a pigment, and 50 weight percent to 99 weight percent of a filler.

In embodiments, the amount of the pigment and the filler added represent a total weight percent of pigment and filler in the durable ambient light curable waterproof liquid rubber formulation.

The pigment and filler can have a particle dispersion from 4 to 8 units on the Hegman scale.

In embodiments, the formulation includes 0.1 weight percent to 10 weight percent of additives based on a total weight of the resulting durable ambient light curable waterproof liquid rubber formulation.

The additives can be a hindered phenolic stabilizer or a hindered amine ultraviolet stabilizer.

In embodiments, the formulation includes 0.1 weight percent to 10 weight percent of an adhesion promoter based on the total weight of the resulting durable ambient light curable waterproof liquid rubber formulation after adding the second portion of ethylene propylene diene terpolymer (EPDM) to the high viscosity solution.

The adhesion promoter can be a zinc diacrylate or zinc dimethacrylate.

In embodiments, the formulation includes 0.1 weight percent to 10 weight percent of a pigment dispersant based on the total weight of the resulting durable ambient light curable waterproof liquid rubber formulation.

In embodiments, the pigment dispersant can be 1 methoxy-2-propylacetate.

In embodiments, the formulation includes 0.1 weight percent to 10 weight percent of an anti-settling agent based on the total weight of the resulting durable ambient light curable waterproof liquid rubber formulation.

The anti-settling agent can be a hydroxylethyl cellulose and a fumed silica.

In embodiments, the formulation includes 0.1 weight percent to 10 weight percent of a defoamer based on the total weight of the resulting durable ambient light curable waterproof liquid rubber formulation.

The defoamer can be a polymethyl alkyl siloxane, a modified polysiloxane, and a polymethylsiloxane in a solvent.

In embodiments, the formulation includes 0.1 weight percent to 10 weight percent of an air release agent based on the total weight of the resulting durable ambient light curable waterproof liquid rubber formulation.

The air release agent can be a mineral oil, a paraffinic oil, a silicone oil, or a similar oil.

In embodiments, the formulation includes 0.1 weight percent to 30 weight percent of a flame retardant to low viscosity liquid intermediate rubber formulation, based on the total weight of the resulting durable ambient light curable waterproof liquid rubber formulation.

In embodiments, the flame retardant can be an alumina trihydrate.

In embodiments, the formulation includes 0.1 weight percent to 12 weight percent of a wetting agent based on the total weight of the resulting durable ambient light curable waterproof liquid rubber formulation.

The wetting agent can be a silicone polyacrylate copolymer in solvent and a solvent-free polyether modified dimethylpolysiloxane.

In embodiments, the formulation includes 0.1 weight percent to 10 weight percent of a biocide based on the total weight of the resulting durable ambient light curable waterproof liquid rubber formulation.

In embodiments, the biocide can be a methylchloroisothiazolinone.

In embodiments, the formulation can include 0.1 weight percent to 30 weight percent of a low molecular weight non-volatile plasticizer low viscosity liquid intermediate rubber formulation.

The low molecular weight non-volatile plasticizer can be a paraffinic oil, naphthenic oil, plant based oil, diester oil, silicone oil, a mineral oil, a low molecular weight polyalphaolefin, or combinations thereof.

In embodiments, the formulation can include 0.01 weight percent to 10 weight percent of a co-agent based on a total weight of the dual curable waterproof liquid rubber formulation.

The co-agent can include an acrylate, a triallyl cyanurate, a polybutadiene, and a phenylenedimaleimide.

In embodiments, the formulation can include solvents selected from the group: mineral spirits and hexamethyldisiloxane.

In embodiments, the formulation can include different first and second solvent portions.

The following procedure relates to an order of addition in one embodiment of a method for making a durable ambient light curable waterproof liquid rubber formulation.

First, mix 50 percent of the total formulation amount of EPDM polymer and 50 percent of the total formulation amount of mineral spirits (a solvent) in a vessel. Mix the components at a temperature from 20 degrees Celsius to 50 degrees Celsius until a smooth homogenous solution is formed.

Add the remaining 50 percent of the total formulation amount of EPDM to the solution and continue mixing at a temperature from 20 degrees Celsius to 50 degrees Celsius until all of the EPDM is thoroughly mixed forming a smooth viscous solution.

Into this smooth viscous solution, slowly add 100 percent of the total amount of filler used in the durable ambient light curable waterproof liquid rubber formulation and 100 percent of the total amount of pigment (if a pigment is used) used in the durable ambient light curable waterproof liquid rubber formulation.

Once the filler and the pigment (if used) are added, mix at a temperature of from 20 degrees Celsius to 50 degrees Celsius until the mixture forms a smooth grind base. The grind base is mixed to from 4 to 8 on the Hegman scale.

Add the remaining 50 percent of the total amount of solvent (specifically mineral spirits) used in the durable ambient light curable waterproof liquid rubber formulation and 100 percent of the total amount of plasticizers used in the durable ambient light curable waterproof liquid rubber formulation to the grind base.

Mix at a temperature from 20 degrees Celsius to 50 degrees Celsius until all of the solvent and plasticizers are thoroughly incorporated into the solution.

Add in 100 percent of the total formulation amount of any additives that may be used, which can include wetting agents, defoamers, antioxidants, hindered amine light stabilizers, UV absorbers, flame retardants, air release agents, biocides, anti-settling agents, pigment dispersants, and adhesion promoters.

Mix at a temperature from 20 degrees Celsius to 50 degrees Celsius until all of the additives are thoroughly incorporated into the solution. The solution is mixed to from 4 to 8 on the Hegman scale.

Into a separate vessel prepare a solution of 100 percent of a photoinitiator solvent (such as Toluene) and 100 percent of the photoinitiators used in the durable ambient light curable waterproof liquid rubber formulation.

Mix the photoinitiator solvent and the photoinitiators at a temperature from 20 degrees Celsius to 50 degrees Celsius until all of the photoinitiators are dissolved and thoroughly mixed into the solution.

Add 100 percent of the total formulation amount of the photoinitiators solution to the mixture containing the EPDM, solvent (mineral spirits), filler, pigment, and additives.

Mix at a temperature from 20 degrees Celsius to 50 degrees Celsius until all of the components are thoroughly incorporated into the solution and the solution is from 4 to 8 on the Hegman scale. Then add 100 percent of the total formulation amount of peroxide curatives.

Following is a list of example components to be used in the method for making a durable ambient light curable waterproof liquid rubber formulation.

Example 1

| Component | Masterbatch Mix | % |
|---|---|---|
| Dual Cure Coating Example | | |
| EPDM Terpolymer | T-5131 (2788 Mw) Lot GE2G015 | 51.28 |
| Filler | Coupsil 6508 Precipitated Silica | 17.96 |
| Solvent | Mineral Spirits | 20.51 |
| Plasticizer | Dow Corning 200 Fluid | 0.52 |
| Curative | 10% Irgacure in Toluene | 5.13 |
| Curative | 50% Irgacure BP in Toluene | 2.05 |
| Curative | TBPB | 2.56 |
| | Viscosity (centipoise) | 50000 |
| | VOC (gms/L) | 249 |

Example 2

1006-99-1

| Component | Ingredient | % |
|---|---|---|
| EPDM Terpolymer | T-5131 Lot GE2G015 (2788 Mw) | 44.61 |
| Filler | Coupsil 6508 Precipitated Silica | 13.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.9 |
| Curative | Peroxan PO | 2.23 |
| Flame Retardant | Trikup ATH | 2.23 |
| Pigment | Kronos 2300 | 1.12 |
| | Viscosity (cP) | 5230 |
| | VOC (gms/L) | 348 |

Example 3

| Component | Ingredient | % |
|---|---|---|
| EPDM Terpolymer | Trilene 65 Standard | 34.1 |
| Solvent | Mineral Spirit | 17.05 |
| Solvent | HMDS Solvent | 17.05 |
| curative | Irgacure 819 | 1.7 |
| Solvent | Toluene | 6.81 |
| Curative | Luperox 101 | 0.57 |
| Pigment | TiO$_2$ | 11.36 |
| Filler | Cupsil 6508 Silica | 11.36 |
| | Viscosity (cP) | >20 K |
| | VOC (gms/L) | 239 |

Example 4

Formulation with Defoamer

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Defoamer | BYK 052 | 10.00 |

Example 5

Formulation with Anti-Settling Agent

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Anti-Settling Agent | MPA 1078 | 10.00 |

Example 6

Formulation with a Flame Retardant

| Component | Ingredient | % |
|---|---|---|
| EPDM Terpolymer | Trilene 5131 | 38.61 |
| Filler | Coupsil 6508 | 2.61 |
| Solvent | Mineral Spirits | 19.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 30.00 |
| Pigment | Kronos 2300 | 0.12 |

Example 7

Formulation with a Pigment Dispersant

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Pigment Dispersant | Nuosperse 9100 | 10.00 |

Example 8

Formulation with Biocide

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Biocide | Mergal K9N | 10.00 |

Example 9

Formulation with an Adhesion Promoter

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Adhesion Promoter | SR 634 | 10.00 |

Example 10

Formulation with an Air Release Agent

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Air Release Agent | Ultra 1199 | 10.00 |

Example 11

Formulation with a Wetting Agent

| Component | Ingredient | % |
|---|---|---|
| EPDM Terpolymer | Trilene 5131 | 44.61 |
| Filler | Coupsil 6508 | 3.38 |
| Solvent | Mineral Spirits | 29.74 |
| Plasticizer | Dow Corning 200 Fluid | 0.45 |
| Curative | Irgacure BP | 0.89 |
| Curative | Irgacure 819 | 0.45 |
| Solvent | Toluene | 4.90 |
| Curative | Peroxan PO | 2.23 |
| Flame Retardant | ATH | 2.23 |
| Pigment | Kronos 2300 | 1.12 |
| Wetting Agent | BYK 378 | 10.00 |

While these embodiments have been described with emphasis on the embodiments, it should be understood that within the scope of the appended claims, the embodiments might be practiced other than as specifically described herein.

What is claimed is:

1. A method for making a durable ambient light curable waterproof liquid rubber formulation with a volatile organic compound content of less than 450 grams per liter, comprising:
   a. blending in a closed vessel forming a solution, a first portion of ethylene propylene diene terpolymer (EPDM) with a first portion of solvent, wherein the ethylene propylene diene terpolymer (EPDM) is 50 weight percent to 99 weight percent of a total amount of ethylene propylene diene terpolymer used in a resulting durable ambient light curable waterproof liquid rubber formulation and the first portion of solvents is 33 weight percent to 67 weight percent of a total amount of solvent used in the resulting durable ambient light curable waterproof liquid rubber formulation;
   b. mixing the solution in a high shear mixer for at least 10 to 240 minutes at a temperature from 20 degrees Celsius to 50 degrees Celsius forming a high viscosity solution;
   c. adding a second portion of ethylene propylene diene terpolymer (EPDM) to the high viscosity solution, wherein the second portion of ethylene propylene diene terpolymer (EPDM) is 0.1 weight percent to 50 weight percent of the total amount of ethylene propylene diene terpolymer (EPDM) used in the resulting durable ambient light curable waterproof liquid rubber formulation;
   d. adding a second portion of solvent to the high viscosity solution wherein the second portion of solvent is 33 weight percent to 80 weight percent of a total amount of solvent used in the resulting durable ambient light curable waterproof liquid rubber formulation;

e. blending the high viscosity solution for 10 minutes to 120 minutes at a temperature from 20 degrees Celsius to 50 degrees Celsius to form a low viscosity liquid intermediate rubber formulation with a saturated backbone of propylene, a saturated backbone of ethylene, and an unsaturated diene with ultra violet activated sites capable of crosslinking with or reacting with a free radical or a free radical on another terpolymer;

f. adding 0.1 weight percent to 10 weight percent of a free radical producing photoinitiator devoid of thermally activated accelerators to the low viscosity liquid intermediate rubber formulation based on the total weight of the resulting dual curable waterproof liquid rubber formulation to generate free radicals that react with the active sites of the unsaturated diene, forming a low viscosity liquid intermediate rubber formulation with photoinitiator, wherein the photoinitiators include: Type I photoinitiators including: bis (2,4,6-trimethylbenzoyl)-phenyl phosphineoxide, and 1-hydroxy-cyclohexyl-phenyl-ketone; and Type II photoinitiators include: benzophenone, alpha hydroxyl ketone, alpha amino ketone, isothioxanthone, and combinations thereof, and wherein all the photoinitiators are devoid of thermally activated accelerators;

g. adding 0.1 to 15 weight percent of a peroxide to the a low viscosity liquid intermediate rubber formulation with photoinitiator, wherein the peroxide comprises at least one of: a peroxyketal, a peroxyester, a dialkyl peroxide, a peroxy carbonate, or an azo initiator forming a dual cure liquid; and h. blending the dual cure liquid at a low shear for 10 minutes to 120 minutes at an ambient temperature from 20 degrees Celsius to 50 degrees Celsius in the absence of light forming the dual ambient light curable waterproof liquid rubber formulation, wherein the dual ambient light curable waterproof liquid rubber formulation is adapted to form a waterproof seal on a substrate in the presence of ambient light and ambient heat.

2. The method of claim 1, wherein the first portion of ethylene propylene diene terpolymer has a different molecular weight than the second portion of ethylene propylene diene terpolymer.

3. The method of claim 1, comprising:
a. adding to the high viscosity solution at a temperature from 20 degrees Celsius to 50 degrees Celsius at least one of:
(i) 50 weight percent to 99 weight percent of a pigment; and
(ii) 50 weight percent to 99 weight percent of a filler; and
wherein the amount of the pigment and the filler added represent a total weight percent of pigment and filler in the high viscosity solution; and
b. blending the pigment and filler to a particle dispersion from 4 to 8 units on the Hegman scale.

4. The method of claim 1, further comprising adding to the low viscosity liquid intermediate 0.1 weight percent to 10 weight percent of additives based on a total weight of the resulting durable ambient light curable waterproof liquid rubber formulation and the additives are at least one of: a hindered phenolic stabilizer or a hindered amine ultraviolet stabilizer.

5. The method of claim 1, further comprising adding to the low viscosity liquid intermediate 0.1 weight percent to 10 weight percent of an adhesion promoter based on the total weight of the resulting durable ambient light curable waterproof liquid rubber formulation after adding the second portion of ethylene propylene diene terpolymer (EPDM) to the high viscosity solution, wherein the adhesion promoter is at least one of: a zinc diacrylate or zinc dimethacrylate.

6. The method of claim 1, further comprising adding to the low viscosity liquid intermediate rubber formulation: 0.1 weight percent to 10 weight percent of a pigment dispersant based on the total weight of the resulting durable ambient light curable waterproof liquid rubber formulation, wherein the pigment dispersant is 1methoxy-2-propylacetate.

7. The method of claim 1, further comprising adding to the low viscosity liquid intermediate rubber formulation: 0.1 weight percent to 10 weight percent of an anti-settling agent based on the total weight of the resulting durable ambient light curable waterproof liquid rubber formulation, wherein the anti-settling agent is at least one of a hydroxyl ethyl cellulose and a fumed silica.

8. The method of claim 1, further comprising adding to the low viscosity liquid intermediate rubber formulation 0.1 weight percent to 10 weight percent of a defoamer based on the total weight of the resulting durable ambient light curable waterproof liquid rubber formulation, and wherein the defoamer is at least one of: a polymethyl alkyl siloxane, a modified polysiloxane, and a polymethylsiloxane in a solvent.

9. The method of claim 1, further comprising adding to the low viscosity liquid intermediate rubber formulation 0.1 weight percent to 10 weight percent of an air release agent based on the total weight of the resulting durable ambient light curable waterproof liquid rubber formulation, wherein the air release agent comprises at least one of: a mineral oil, a paraffinic oil, a silicone oil, or a similar oil.

10. The method of claim 3, further comprising adding 0.1 weight percent to 30 weight percent of a flame retardant to low viscosity liquid intermediate rubber formulation, based on the total weight of the resulting durable ambient light curable waterproof liquid rubber formulation, wherein the flame retardant comprises: an alumina trihydrate, by adding:
a. with a member of at least one of: a pigment, a filler, and an additives to the low viscosity liquid intermediate rubber formulation; or
b. after the second portion of ethylene propylene diene terpolymer is added to the high viscosity solution.

11. The method of claim 1, further comprising adding to the low viscosity liquid intermediate rubber formulation 0.1 weight percent to 12 weight percent of a wetting agent based on the total weight of the resulting durable ambient light curable waterproof liquid rubber formulation, wherein the wetting agent is at least one of: a silicone polyacrylate copolymer in solvent and a solvent-free polyether modified dimethylpolysiloxane.

12. The method of claim 1, further comprising adding to the low viscosity liquid intermediate rubber formulation 0.1 weight percent to 10 weight percent of a biocide based on the total weight of the resulting durable ambient light curable waterproof liquid rubber formulation, wherein the biocide is a methylchloroisothiazolinone.

13. The method of claim 1, further comprising adding 0.1 weight percent to 30 weight percent of a low molecular weight non-volatile plasticizer low viscosity liquid intermediate rubber formulation after the second portion of solvent is added to the high shear mixture, wherein the low molecular weight non-volatile plasticizer comprises: a paraffinic oil, naphthenic oil, plant based oil, diester oil, silicone oil, a mineral oil, a low molecular weight polyalphaolefin, or combinations thereof.

14. The method of claim 1, further comprising adding 0.01 weight percent to 10 weight percent of a co-agent to the low viscosity liquid intermediate rubber formulation based on a total weight of the resulting dual curable waterproof liquid rubber formulation of a co-agent to the second low viscosity liquid intermediate rubber formulation, wherein the co-agent comprises at least one of: an acrylate, a triallyl cyanurate, a polybutadiene, or a phenylenedimaleimide.

15. The method of claim 1, wherein the first portion of solvent and the second portion of solvent are selected from the group: mineral spirits and hexamethyldi-siloxane.

16. The method of claim 15, wherein the first portion of solvent and the second portion of solvent are different solvents.

* * * * *